SUPERCONDUCTING CURRENT MULTIPLIER

Filed June 22, 1962

2 Sheets-Sheet 1

Inventors:
Harold H. Edwards,
Vernon L. Newhouse,
by John P. DeWitt
Their Attorney.

Nov. 23, 1965 H. H. EDWARDS ET AL 3,219,841

SUPERCONDUCTING CURRENT MULTIPLIER

Filed June 22, 1962 2 Sheets-Sheet 2

Inventors:
Harold H. Edwards,
Vernon L. Newhouse,
by John P. Dellitt
Their Attorney.

United States Patent Office 3,219,841

Patented Nov. 23, 1965

3,219,841

SUPERCONDUCTING CURRENT MULTIPLIER

Harold H. Edwards, Schenectady, and Vernon L. Newhouse, Scotia, N.Y., assignors to General Electric Company, a corporation of New York Filed June 22, 1962, Ser. No. 204,587

21 Claims. (Cl. 307—88.5)

Figure 1:
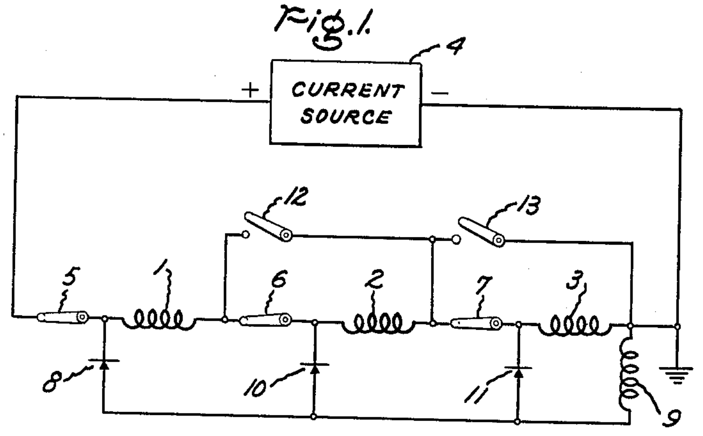

The present invention relates to current multiplying circuitry and more particularly to current multiplying circuitry emlpoying superconductive elements.

A number of metals are known which exhibit superconductivity, that is which lose electrical resistance at extremely low temperatures near the temperature of liquid helium. Among such materials are tin, lead, tantalum and niobium, as well as numerous alloys. Conductors formed of these materials when appropriately refrigerated will pass a current and remain resistanceless as long as the current does not exceed a specified value known as the conductor's critical current. When the critical current is reached, the conductor reverts to a resistive condition.

Likewise superconductors are sensitive to magnetic fields; a magnetic field known as the superconductor's critical field causes the superconductor to exhibit electrical resistance. Superconductors in a magnetic field may be classified as "hard" superconductors and "soft" superconductors. A first superconductor is considered hard relative to another (soft) superconductor if a comparatively larger magnetic field is required for causing the first superconductor's resistance to appear.

Switching and control devices can be formed with a combination of hard and soft superconductors. For example, current flow in a soft superconductor may be controlled with a magnetic control coil or the like constructed of a hard superconductor material. The hard superconductor coil generates a field capable of rendering resistive the soft superconductor; but, so long as the current or field is not too great, the hard superconductor itself remains resistanceless. Devices of this type are set forth and claimed in Patent 2,935,694 to R. W. Schmidtt et al., issued May 3, 1960, assigned to the assignee of the present invention. Switching circuits are conveniently formed from such devices for utilization in computing apparatus and the like. Since superconducting circuit elements are normally resistanceless, entire circuits may be greatly miniaturized and compacted, whereby an extensive apparatus may be conveniently placed in a common refrigeration means.

A superconducting circuit conventionally operates from one or more current sources, preferably sources of constant current. A current source is required because the superconducting current path contains no resistance and therefore produces no voltage drop. The present invention concerns an apparatus for transforming or multiplying this current to a higher value within the superconducting circuit. By means of the present invention, larger currents are conveniently available to the superconducting circuit than are readily obtainable from the remote supply. Moreover, current attenuation caused by current flow in diverse paths in the circuit can be alleviated by means of the present invention. Not only is attenuation avoided, but regardless of the current supply available, an inherent advantage results from current multiplication within the superconducting circuit itself. Also the multiplied current is frequently more useful as a satisfactory output or the like if it is multiplied or increased. The circuit apparatus in accordance with the present invention contemplates storage of energy, initially derived from the current supply, in the magnetic fields of plural inductive elements, and subsequent connection of these elements in parallel for delivery of this energy to a common load. The current in the common load is thereby multiplied by a factor approximately equal to the number of such inductive elements.

Conventional means for providing current increase are not particularly useful in superconducting circuits. For example, conventional transformers used for increasing current are comparatively expensive and of course operate on alternating current, while superconducting circuits are ordinarily D.C. circuits. Moreover, for miniaturization purposes, superconducting circuits are frequently printed or deposited on a flat substrate. Construction of deposited transformers on such a surface is not generally satisfactory. Likewise deposition of various other circuit elements is more difficult than deposition of simple inductance and associated switching elements.

It is therefore an object of the present invention to provide a new class of device for increasing or multiplying current.

Another object of this invention is to provide current multiplying circuitry which is particularly adapted to planar circuits.

It is another object of the present invention to provide improved current multiplying devices for superconducting circuitry, and to provide storage devices for storing multiple currents.

In accordance with specific embodiments of the present invention, a current is applied separately or in series to several inductances. This circuit is then interrupted and these same inductances are reconnected in parallel with one another and with a common load forming a loop circuit with the load. As the original supply current is discontinued, the field starts to collapse in each inductance and provides a reverse current therein and the reverse currents from the several inductances add together in the parallel connection. Thus increased current in the common load is easily attained which is several times that originally applied to the individual inductances. If the entire circuit including the load is superconducting, the loop current established through the common load continues to flow indefinitely; that is the current "persists." This current, as initiated by field collapse in the inductances, encounters no resistance with which to impede or dissipate the current. This stored loop current in the circuit is likewise much larger than the current originally applied to the original inductances, the current multiplication being approximately equal to the number of such inductances.

Although the invention is particularly efficacious as embodied in superconducting devices, and is hereinafter described primarily in connection therewith, it will be appreciated by those skilled in the art that the invention in the broader aspects is not restricted to low temperature circuitry.

Figure 2:
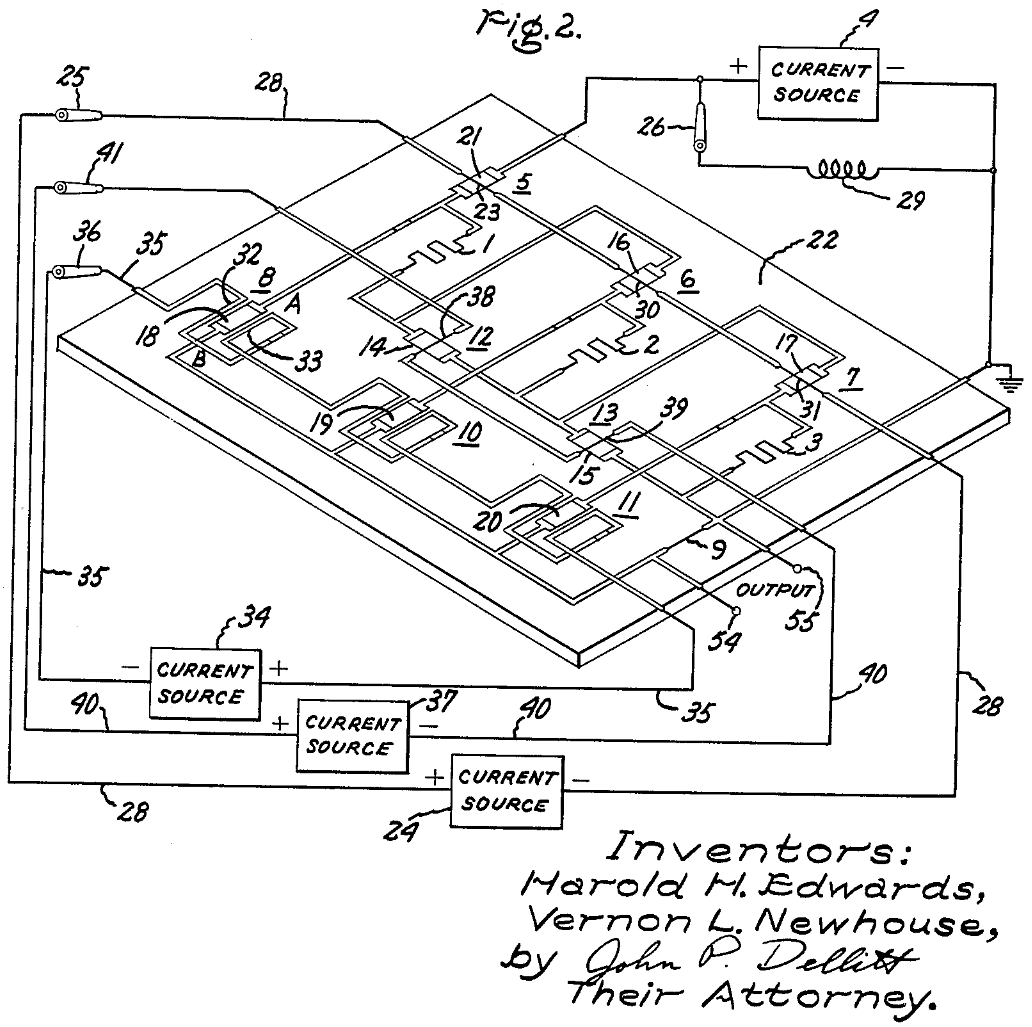
Figure 3:
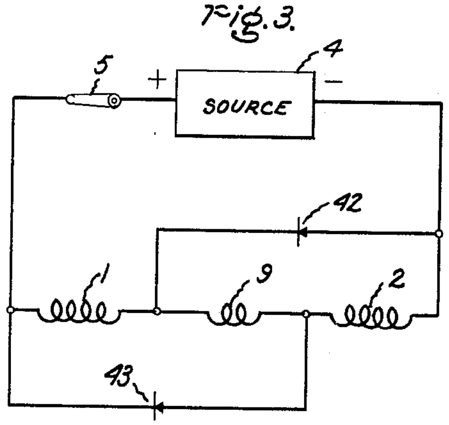
Figures 4, 5:
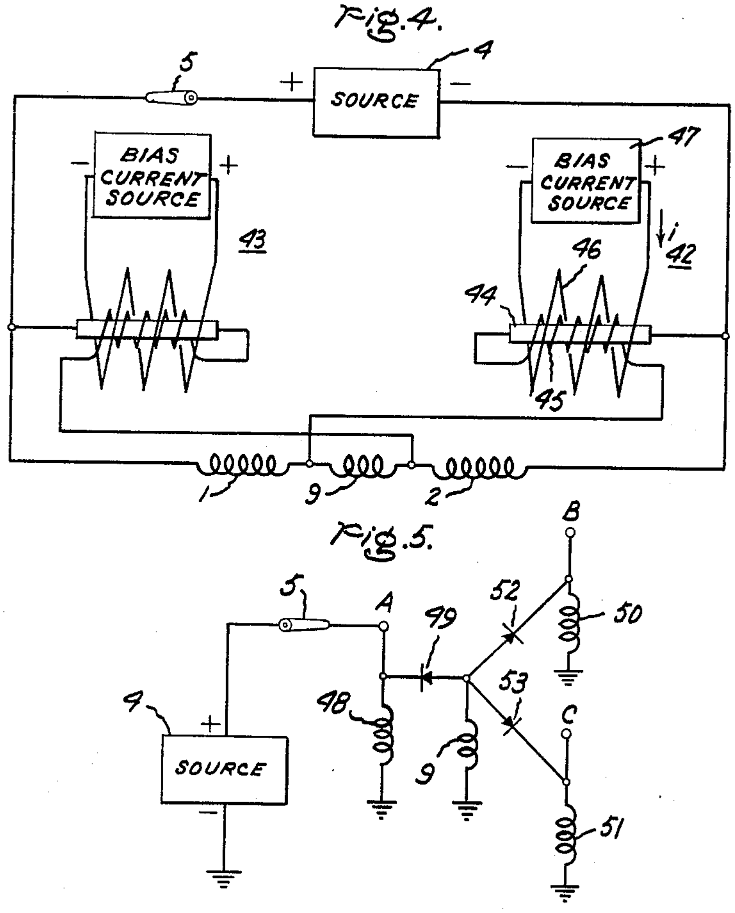

The subject matter which we regard as our invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

FIG. 1 is a schematic diagram of a current multiplying circuit in accordance with the present invention, FIG. 2 is a perspective view of a planar superconducting embodiment of the present invention similar in its operation to the circuit depicted in the FIG. 1 schematic diagram, FIG. 3 is a schematic diagram of another embodiment in accordance with the present invention, FIG. 4 is a wiring diagram in accordance with the FIG. 3 schematic diagram, further illustrating superconducting control devices, and FIG. 5 is a schematic diagram of another embodiment in accordance with the present invention.

FIGS. 1 and 2 illustrate a specific arrangement according to the present invention. FIG. 1 is a schematic diagram, while FIG. 2 is a planar superconducting embodiment thereof including several illustrative changes and additions. The illustrated embodiment funtcions to connect across a current source a plurality of inductive elements, whereby a common direct current flows through these inductive elements. The inductive elements are then switched to a parallel arrangement, supplying current to a common load. The common load is desirably superconducting. The current through the common load is approximately $n$ times the current from the current source, where $n$ is the number of inductive elements.

Referring particularly to FIG. 1, plural inductive elements 1, 2 and 3 are disposed in series across a current source 4, the negative terminal of which is returned to a point of common reference potential, i.e. ground. Each inductive element may be considered to comprise an inductance or inductive winding with a terminal at either end thereof. Switching means 5 is interposed between the positive terminal of current source 4 and inductive element 1. Other switching means, 6 and 7, are respectively located between inductive elements 1 and 2 and between inductive elements 2 and 3. A unilateral conductor, or diode, 8 connects the juncture of conductive element 1 and switching element 5 to load 9, the remaining terminal of load 9 being connected to ground. Load 9 is ordinarily superconductive and is therefore indicated as an inductance, since a superconductive load contains no resistance. However, load 9 desirably exhibits much less inductance than any one of inductive elements 1, 2 or 3.

Another unilateral conductor 10 couples the common connection of inductive element 2 and switching means 6 to load 9 while yet another unilateral conductor 11 connects the juncture of inductive element 3 and switching means 7 to load 9. Unilateral conductors or diodes 8, 10 and 11 are poled in a direction to present their back impedance to current flow between current source 4 and load 9. Switching means 12 is interposed between the element 1-switch 6 junction and the junction between inductive element 2 and switch 7. The interconnection between inductive element 2 and switch 7 is coupled to ground via switching element 13.

It is understood the various switching means and unilateral conductors as set forth herein may each alternatively comprise any current flow determining element which is approximately timed in its operation; unilateral conductors or diodes are, however, preferred where illustrated, in order to aid the automatic operation of the circuit.

According to a preferred version of the present invention all the components shown in FIG. 1, with the exception of the current source, are capable of superconduction, while the entire circuit is refrigerated to approximately the temperature of liquid helium (by means not shown). The metallic conductors, switching elements, diodes, and the like are therefore all formed of superconducting materials.

In operation, the circuit illustrated in FIG. 1 provides a larger current to load 9 than available from current source 4. In the position of the switches as shown, current flows from source 4 through closed switching means 5 and successively through inductive element 1, switch 6, inductive element 2, switch 7 and inductive element 3 to ground. The current flow through inductive elements 1, 2 and 3 establishes a magnetic field within each of these inductances which represents storage of energy. Assuming steady state conditions, this current will be unimpeded by resistance except that of the source and the source leads. Current does not at this time flow in unilateral conductors 8, 10 and 11 inasmuch as they are oriented to present their back impedance to the flow of current between the current source and ground. At this time, then, essentially no current flows through load 9. Now, in order to operate the circuit, switches 12 and 13 are first closed, after which switches 5, 6 and 7 are opened. In the superconductive embodiment of the present invention switches 12 and 13 may be closed at any time because no voltage drop exists across inductive elements 1, 2 and 3. In a non-superconducting arrangement, switching elements 12 and 13 should be closed and switching elements 5, 6 and 7 opened within the inductive time constant of elements 1, 2 and 3.

As the source of current is removed by opening switch element 5, and also switches 6 and 7, the magnetic flux stored in inductive elements 1, 2 and 3 will collapse causing a reverse voltage to occur across each of these elements. This voltage is of the correct polarity to cause current flow through unilateral conductors 8, 10 and 11. Reactive current will thus flow from inductive element 1, through unilateral conductor 8, load 9 and through switching elements 13 and 12 back to inductive element 1. In like manner reactive current will flow from inductive element 2 through unilateral conductor 10, load 9 and switching element 13. Also current will flow from inductive element 3 through unilateral conductor 11 and through load 9. Providing inductive load 9 has a value of inductance much less than the inductive elements 1, 2 and 3, current flow in load 9 will be approximately three times that originally provided by current source 4. If more than 3 inductive elements are present, current in load 9 will be approximately $n$ times the current from the current source where $n$ is the number of such elements.

Now, providing the circuit is superconductive, the current from inductive elements 1, 2 and 3, flowing through load 9, will continue to flow indefinitely. The current paths from the inductive elements through the load as set forth become persistent current loops and this current continues to circulate in these loops through load 9 because no resistance is present to dissipate this current. If, on the other hand, load 9 is not superconductive, the current delivered by the three inductances will be in the form of a current pulsation, having the aforementioned increased value. From the above it is evident that current multiplication is conveniently provided by a plurality of inductive elements and a single current source.

FIG. 2 illustrates a superconducting embodiment of the present invention in planar form wherein the numbered elements perform the same functions as like numbered elements in the FIG. 1 diagram. The entire FIG. 2 circuit is formed on an insulated plate 22. All the conductors shown are hard superconductors except certain gate elements, numbered 14–21, which are soft superconductors. That is to say the said soft superconductors become resistive in a weaker magnetic field than the other conductors shown. The hard superconductors are conveniently formed of lead while the soft superconductors may be tin. The entire apparatus upon plate 22 is refrigerated to approximately the temperature of liquid helium by means not shown.

As in the FIG. 1 diagram, a source 4 provides current to inductive elements or inductances 1, 2 and 3 disposed in series. In the FIG. 2 embodiment these inductances are formed as circuitous deposited conductors which are narorwer than their interconnecting conductors. Switching means 5 is interposed between inductive means 1 and current source 4. Switching means 6 is interposed between inductive means 1 and 2 and likewise switching means 7 connects inductive elements 2 and 3.

Unilateral conductors 8, 10 and 11 respectively couple the high end of each inductive means to inductive load 9, load 9 comprising a narrow deposited superconductor disposed between output terminals 54 and 55. It is understood such load may be external to plate 22 if desired. Switching means 12 and 13 again jointly connect the low terminals of inductive means 1 and 2 to the grounded terminal of current source 4.

In the FIG. 2 embodiment, circuit elements are used which are particularly adaptable to planar superconducting circuits. For example, switching means 5 in the FIG. 2 embodiment is a "cryotron," which includes a soft gate 21 crossed by narrow hard grid 23. The grid is insulated from the gate but influences the gate through the generation of a high intensity magnetic field in close proximity to the gate. A current passed through grid 23 and derived from current source 24 through closed switch 25 and conductors 28 is sufficient for generating a field around grid 23 which renders the underlying gate 21 resistive. Under these circumstances current from current source 4 will be forced to flow in an alternative higher inductance path represented at 29 until such time as switching means 5 provides a closed circuit and a switching means 26 in series with inductance 29 is opened. A closed circuit through switching means 5 occurs when switch 25 is opened and the field of grid 23 ceases to cause gate 21 to be resistive.

Switching means 6 and 7 including gates 16 and 17 and overlying grids 30 and 31, respectively, are constructed and operate in the same manner and at the same time as switching means 5; grids 30 and 31 are in series with grid 23 in the same circuit with conductor 28 and switch 25. If switch 25 is open, current from current source 4 will be permitted to flow in the series circuit consisting of inductive elements 1, 2 and 3. The current therein produces a field concentrated in inductive elements 1, 2 and 3.

Switches 12 and 13 are actuated in a similar manner. A current from source 37 flowing through conductor 40, switch 41 and grids 38 and 39 effectively prevents current flow in gates 14 and 15 until switch 41 is opened.

In the embodiment of FIG. 2, unilateral conductors 8, 10 and 11 take the form of deposited cryogenic diodes or "cryodes." Each cryode includes a soft gate and a pair of hard control conductors deposited along the lateral edges of the gate. Referring particularly to unilateral conductor 8 comprising a cryode, gate means 18 has disposed along one lateral edge thereof a side conductor 32. A second side conductor 33 is disposed along the second lateral edge of gate 18. These two side conductors are arranged in series in such a manner that current flows in the same direction in each side conductor relative to the gate 18. Current supplied from a curent source 34 flows through side conductor 32 in a direction designated B–A on the drawing, reaching this side conductor via conductor 35 and switch 36. The same current also flows in the same direction in side conductor 33.

The cryode functions to present a resistance to current flow in direction A–B through gate 18. However, due to the direction of current in the side conductors, the same gate will present no resistance to the flow of current in direction B–A. This unilateral conductor, having a diode action, is more fully set forth and claimed in our copending application Serial Number 76,324, now Patent No. 3,182,275, filed December 16, 1960, and assigned to the assignee of the present invention. Briefly, according to the operation of the device, current flow in direction B–A in gate 18 raises the critical current in the gate in combination with the current flow in side conductors 32 and 33, because all three currents are then flowing in the same direction. The combination of the three currents causes magnetic flux to flow around the group, avoiding the gate 18 to some degree. However for current flow in gate 18 in the direction opposite to current flow in the side conductors, the gate 18 becomes resistive at very low values of current passing therethrough. It does so because the flux from all three conductors is then more concentrated in the vicinity of the gate, tending to render the gate resistive. Thus unilateral conduction is achieved on a flat plane with a simple deposited device operative at low temperatures.

Unilateral conductors 10 and 11 also comprise cryodes, according to the embodiment of FIG. 2, and operate in the same manner as set forth with respect to the unilateral conductor 8. Their side conductors are connected in a common series circuit with the side conductors 32 and 33 so they are energized in the same direction with the common current from source 34.

The operation of the FIG. 2 embodiment is generally the same as that described with respect to the FIG. 1 diagram. Briefly, inductive elements 1, 2 and 3 are connected in series by providing a closed circuit through switching means 5, 6 and 7. Operation of these switching means is accomplished by opening switch 25 causing a cessation of current from current source 24 via conductor 28 to the grids 23, 30 and 31. As this grid current is removed, the gates 21, 16 and 17 are allowed to become superconductive. Switching means 26 is now opened whereby current flows from current source 4 through inductive elements 1, 2 and 3. At this time, current from current source 37 flows, via conductor 40 and closed switch 41, through grids 38 and 39 of switching means 12 and 13; therefore, gates 14 and 15 of switching elements 12 and 13 are resistive so they inhibit the flow of current. The current from current source 4 will, of course, completely prefer a resistanceless path and therefore will flow entirely through inductive elements 1, 2 and 3. Unilateral conductors 8, 10 and 11 similarly present a resistance in the direction A–B, preventing current from flowing past gates 18, 19 and 20.

In order to transfer the stored energy for delivery in a parallel circuit, switching elements 12 and 13 are first activated. This activation is accomplished by opening switch 41 so that current through grids 38 and 39 is removed and gates 14 and 15 are allowed to pass current. At first no current will flow in gates 14 and 15 because no voltage drop exists thereacross. However, switching means 26 is now closed and switching means 5, 6 and 7 are then open circuited, by reclosing switch 25, in order to supply grid current through grids 23, 30 and 31 rendering resistive gates 21, 16 and 17. A reactive voltage occurring across inductive elements 1, 2 and 3 is opposite in polarity direction to the original voltage drop caused thereacross. This reactive voltage forces current flow in direction B–A in each of the unilateral conductors 8, 10 and 11, their forward or superconductive direction. Conduction in these unilateral conductors completes a current path from the inductive elements 1, 2 and 3 through load 9. Providing load 9 contains considerably less inductance than inductive elements 1, 2 and 3, a current will flow in load 9 approximately equal to the current originally derived from the current source 4 multiplied by the number of inductive elements, here being equal to three. As described in connection with FIG. 1, when load 9 is superconducting, the increased current will continue to flow therethrough indefinitely.

We have thus far described embodiments of the present invention wherein inductive elements are reconnected in parallel using active switching elements. The system which will be described in connection with FIGS. 3 and 4 provides for the automatic completion of a parallel circuit of inductances automatically when the source of current is removed. FIG. 3 illustrates a schematic diagram and FIG. 4 illustrates a wiring diagram, respectively, of one such embodiment of the present invention.

Referring to the schematic diagram of FIG. 3, a source 4 which may be a current source is disposed across a series combination of inductive elements or inductances 1 and 2 and load 9 as switch 5 is closed. Load 9 is located intermediate the two inductive elements. A first switching element 42, which may comprise a unilateral conductor, is disposed between a first end of the series combination and the remote load terminal. Likewise a separate switching element 43, which may also be a unilateral conductor, couples the remaining end of the series arrangement to the load terminal remote therefrom. Elements 42 and 43, as unilateral conductors or diodes, are poled to inhibit the flow of current therethrough when source 4 is connected in the circuit.

As with the previous embodiments, the circuit in its preferred form includes all superconducting elements with the exception of the source 4 and possibly switch 5. For this reason load 9 is indicated as inductive because it would exhibit no resistance. The inductance of load 9 is, however, materially less than the inductance values of inductive elements 1 and 2.

In operation, the circuit of FIG. 3 provides a larger current through load 9 than is available from source 4, and does so without the need of certain active switching elements, e.g. those numbered 12 and 13, in FIG. 1, for connecting the inductive elements in parallel. In the position shown for switch 5 in FIG. 3, current flows through inductive element 1, load 9 and inductive element 2, establishing a magnetic field associated with inductive elements 1 and 2. Each magnetic field represents the storage of energy. Now, in order to provide a multiplied current through load 9, switch 5 is first opened. As the magnetic field associated with inductive elements 1 and 2 starts to collapse, a polarity of voltage occurs across elements 1 and 2 which is opposite from that originally applied. This voltage is of the correct polarity for causing current flow through unilateral conducting elements 42 and 43. If the inductance of load 9 is materially less than the aforementioned inductive elements, the current flow in load 9 will now approximately double and this current flow will continue in load 9 if the load and the other elements are superconducting.

As indicated, it is also possible to employ conventionally operable switches at 42 and 43. In this instance such switching elements may be closed at any time prior to opening of switch 5, providing the circuit is superconducting. If the circuit is non-superconducting, switching elements 42 and 43 are first closed, after which switch 5 is opened, well within the inductive time constant of elements 1 and 2. It is preferred the elements 42 and 43 be unilateral conductors since this allows the current multiplying action to be automatic.

FIG. 4 is a wiring diagram according to the FIG. 3 schematic showing, utilizing certain superconductive elements. In the FIG. 4 illustration, all conductors and circuit devices are superconducting with the exception of the source 4 and with the possible exception of switch 5.

In FIG. 4, switching elements 42 and 43 comprise biased unilateral conductor elements and are superconducting device. Referring particularly to element 42, this unilateral conductor basically comprises a doubly biased cryotron. Element 42, as a unialteral conductor, operators to provide a high critical current flow in one dierction through gate 44 while providing a low critical current for current flow in the opposite direction. The cryotron gate 44, composed of soft superconducting material and constituting the main current flow path of the element, has disposed therearound a control coil 45 of hard superconducting material. The coil 45 is capable causing resistance in the gate 44 without itself becoming resistive. A second control coil 46 is also constructed of hard superconducting material and functions in the same manner as coil 45. Control coil 45 is connected in series with gate 44; it is therefore also in series with the main current flow path of the unilateral conductor 42. Bias current source 47 supplies a current to control coil 46 which current is approximately equal in its magnetic effect to that of coil 45. Since element 42, as a unilateral conductor, operates to provide a high critical current flow in one direction through gate 44, while providing a low critical current for current flow in the opposite direction, current flow in one direction encounters resistance while current flow in the other does not. Preferably, this unilateral action is achieved by arranging coils 45 and 46 so magnetic flux bucks or cancels for current flow in one direction through the element, but adds for current flow in the opposite direction. Assume a bias current source 47 supplies current to coil 46, no quite sufficient for causing resistance in gate 44. Current flow from the positive terminal of source 47 produces a flux from left to right through coil 46. Current source 41, when connected, causes a current flow in coil 45 also producing a left to right or additive flux in the vicinity of gate 44, thereby insuring the resistance of gate 44. However, when switch 5 is opened to disconnect current source 4, the reaction voltage of inductive element 2 tends to cause current flow in the opposite direction through gate 44 as well as coil 45. The flux produced by coil 45 now bucks or cancels that from coil 46 allowing gate 44 to become superconducting. It is appreciated coil 46 may be replaced with another direct field producing means, for example a permanent magnet.

The general operation of the circuit set forth in FIG. 4 is substantially identical with that described in connection with FIG. 3. Preferably, switch 5 is first opened whereupon the reaction voltage of inductive elements 1 and 2 each produces a current flow in load 9. If load 9 is superconducting the increased current will continue flowing in the two loops indefinitely. The inductance of load 9 is preferably much less than the inductance of elements 1 and 2 whereby current through load 9 is substantially double that attainable from current source 4.

FIG. 5 is a schematic diagram of a circuit which can perform nearly any degree of current multiplication. In accordance with this embodiment, current is applied separately to a plurality of inductances, which in turn supply reactive current to a common load. Referring to the figure, a source 4 is coupled to a first terminal, A, of an inductive element 48 via a switch 5. The remaining terminal of the inductive element as well as the source are returned to ground. A unilateral conductor 49 connects the A terminal of inductive element 48 to load 9, also being returned to ground. Unilateral conductor 49 is poled to inhibit current flow from source 4 toward load 9. Again, unilateral conductor 49 may be replaced with a suitably operated switching element but the unilateral conductor is preferred inasmuch as it aids automatic operation.

Other similar inductive elements 50 and 51 may be coupled to the higher terminal of load 9 via unilateral conductors 52 and 53, oriented in the same fashion as unilateral conductor 49. Inductive element 50 is provided with a current input terminal, B, for connection to a source current similar to source 4. Likewise, terminal C is a current input terminal for inductive element 51. Although three inductive elements are illustrated, it is understood further such inductive elements may be similarly coupled in parallel with load 9 through back biased unilateral conductors.

As in the previous embodiments, the circuit elements are preferably superconducting. Load 9 is therefore resistanceless and is illustrated as an inductance. However, its value of inductance should be much less than that of inductive elements 48, 50 and 51.

In the operation of the FIG. 5 circuit, current flows from source 4 through closed switch 5 and inductive element 48 establishing a magnetic field associated wtih inductive element 48. No current flows through diode 49 toward load 9 at this time since such current flow is in a direction inappropriate to unilateral conductor 49. Now switch 5 is opened, whereupon reactive voltage is developed by inductive element 48 causing a current flow through unilateral conductor 49 and load 9. If the elements are superconducting in this loop, the current set up will continue indefinitely, or until resistance is inserted in the circuit or the circuit is otherwise broken.

Similarly current may be applied to terminals B and C and then discontinued whereupon inductive elements 50 and 51 also provide current for load 9. Such an operation may take place with respect to inductive elements 50 and 51 simultaneously with the operation of inductive element 48, or sequentially as desired. The resulting current flow in load 9 will be additive comprising the reactive currents from these various inductors, and will be greater than the current as supplied to the inductors. In a particular example, the same source of current may be switched to "charge" the various inductive elements individually in sequence, building up the current in a superconductive load 9 as a persisting current. It thus appears nearly any degree of current multiplication may be achieved with this circuit by increasing the number of inductive elements so long as the critical current of a superconducting load 9 is not exceeded in the superconductive case.

In accordance with the foregoing it is evident the present invention provides circuitry for current multiplication and for providing a multiplied persisting current in superconducting elements. This increased current is easily achieved during simple inductances and switching means, an arrangement easily and economically adaptable to a flat or printed circuit. Nearly any desired degree of current multiplication may be achieved, either in the interest of generating a larger supply current for the circuitry or in the interest of alleviating current attenuation in a given circuit as applied to output or other purposes.

While we have shown and described several embodiments of our invention, it will be apparent to those skilled in the art that many changes and modifications may be made without departing from our invention in its broader aspects; and we therefore intend the appended claims to cover all such changes and modifications as fall within the true spirit and scope of our invention.

What we claim as new and desire to secure by Letters Patent of the United States is:

1. Apparatus for deriving a multiple current comprising a plurality of inductive elements, connection means for passing a current through each of said inductive elements to produce a magnetic field associated with each of said elements, and switching means recoupling said elements in a parallel circuit with one another wherein a parallel current is produced by collapse of the field associated with each of said inductive elements which parallel current is larger than current originally received by the said inductive elements from said coupling means.

2. Apparatus for deriving multiplied energy output for delivery to a load comprising a plurality of inductive elements formed of superconductive material, connection means initially passing a current through each of said inductive elements to produce a magnetic field associated with each of said elements, and switching means for then coupling said elements in parallel with said loading providing a reactive current to said load from each of said superconductive elements.

3. The apparatus according to claim 2 wherein said load is superconducting so that a multiplied current that is persisting flows in said load.

4. A device comprising a plurality of inductors, current supplying means, coupling means for supplying current from said current suplying means to said inductors in series, and switching means for reconnecting the same inductors in parallel after the said current has been supplied thereto in series.

5. The device according to claim 4 wherein said inductors and said switching means are superconductive.

6. An apparatus for supplying multiplied current to a load comprising a plurality of inductances each having first and second end terminals, a source for supplying current in a first direction with respect to a point of common reference potential, circuit means connecting said inductances in series with said source of current including switching means separating said inductances, a plurality of unilateral conductors connecting the terminals of each inductance remote from the point of common reference potential to said load wherein said unilateral conductors are poled to inhibit current flow from said current source in said first direction, and switching means between said point of common reference potential and the other terminal of ones of said inductances for reconnecting said inductances in parallel with said load.

7. The apparatus according to claim 6 wherein said inductances are superconducting.

8. The apparatus as set forth in claim 6 wherein said unilateral conductors each comprise a first superconducting film coupled between an inductance and said load which film has the property of exhibiting resistance in the presence of a predetermined magnetic field, and a pair of films disposed along said first film proximate the longitudinal edges thereof and carrying a current in a direction opposite to said first direction.

9. The apparatus as set forth in claim 8 wherein each said switching means comprise a planar superconducting film having the property of electrical resistance in the presence of a first predetermined magnetic field, and a second superconductor disposed thereacross and insulated therefrom which second superconductor is narrow with respect to the first and has the property of exhibiting electrical resistance at a magnetic field greater than said first magnetic field.

10. The apparatus according to claim 9 further including a common flat insulated substrate for supporting the circuit combination set forth as deposited films thereupon.

11. Apparatus for multiplying current through a load comprising a serial arrangement including a first inductance, a second inductance, and said load wherein said inductances are disposed on either side of said load, means for supplying current to said serial combination and switching means for coupling the terminal of each of said inductances remote from said load to the remote end of said load in order to dispose said inductances and said load in parallel.

12. Apparatus for supplying multiplied current to a load comprising first and second current receiving terminals, a first inductance coupled between the first said terminal and said load, a second inductance coupled between said second terminal and said load, a first unilateral conductor disposed between said first terminal and the juncture between said load and said second inductance, and a second unilateral conductor disposed between said second terminal and the juncture between said load and said first inductance, each of said unilateral conductors being poled to resist current flow in a first direction between said terminals.

13. The apparatus according to claim 12 wherein all said elements are superconductors and wherein said load is superconducting, having a value inductance less than said first or second inductance.

14. The apparatus according to claim 13 wherein each said unilateral conductor comprises a superconducting gate means having the property of exhibiting resistance in the presence of a first predetermined magnetic field, first control means capable of supplying at least a part of said magnetic field, said first control means being connected in series with said gate means to form a series circuit between one of said terminals and said load, and a second means also associated with said gate means for producing a field at said gate means which aids the field of said first control means when current is supplied the apparatus according to claim 13 between said first and second terminals in said first direction.

15. An apparatus for multiplying current through a load comprising a plurality of inductances each having a first terminal, and each having a second terminal in common with said load, means for individually supplying a current to said inductances, and switching means coupled between the first terminal of each of said inductances and the remaining terminal of said load for subsequently coupling said inductances in parallel with said load.

16. An apparatus for multiplying current through a superconductive load comprising a superconducting inductance having a first terminal and having a second terminal in common with said load, means for initially supplying a current to said inductance, and unilateral conductor means coupled between the first terminal of said inductance and the remaining terminal of said load for subsequently coupling said inductance in parallel with said load, said unilateral conductor being poled to inhibit current flow from said means for supplying current toward said load.

17. An apparatus for providing a multiplied current to a load comprising a plurality of inductances each having a first terminal, and each having a second terminal in common with said load, source means for coupling current in a first direction to the first terminal of each inductance, a unilateral conductor coupled between the first terminal of each said inductance and the remaining terminal of said load, each said unilateral conductor being poled to resist current flow to said load from said source means.

18. The apparatus according to claim 17 wherein said inductances, said load and said unilateral conductors are superconductors and wherein said load has a smaller value of inductance than said aforementioned inductances.

19. Apparatus for supplying multiplied current to a superconductive load comprising current input supply means, a first superconductive circuit path coupled to said current input supply means and including said load, a second superconductive circuit path also coupled to said current input supply means and also including said load, each of said paths having inductance, and superconductive switching means for individually completing said circuit paths between said current supply means and said load.

20. An apparatus for providing multiplied current to a superconductive load comprising current supply means, a plurality of superconductive circuit means for individually receiving current from said current supply means and superconductive switching means for coupling said circuit means across said load wherein the superconductive circuit including said load and said circuit means includes inductance for building up current in said load due to reactive current produced in said inductance.

21. Apparatus for multiplying current through a load including current supply means and a plurality of circuit paths for successively receiving current from said supply means, each said path including switching means and also including said load when said switching means establish a closed circuit therewith, said circuit paths including inductance, wherein said switching means are successively closed to provide current to said load.

References Cited by the Examiner

UNITED STATES PATENTS

| | | | |
|---|---|---|---|
| 1,306,147 | 6/1919 | Hess | 320—21 XR |
| 2,470,118 | 5/1949 | Trevor | 321—15 |
| 2,504,321 | 4/1950 | Giacoletto | 321—15 |
| 3,139,588 | 6/1964 | Clarke et al. | 328—223 XR |

OTHER REFERENCES

Pub. I: "Current Gain Storage," in IBM Technical Disclosure Bulletin, vol. 3, No. 7, dated December 1960, page 40.

ARTHUR GAUSS, *Primary Examiner.*